United States Patent [19]

Nemoto et al.

[11] Patent Number: 4,814,900

[45] Date of Patent: Mar. 21, 1989

[54] TRACKING CONTROL APPARATUS USING PILOT SIGNALS OF DIFFERENT FREQUENCIES

[75] Inventors: Shoji Nemoto, Kanagawa; Noboru Murabayashi, Tokyo, both of Japan

[73] Assignee: Sony Corporation, Tokyo, Japan

[21] Appl. No.: 943,125

[22] Filed: Dec. 18, 1986

[30] Foreign Application Priority Data

Dec. 23, 1985 [JP] Japan ............................ 60-289867
Feb. 8, 1986 [JP] Japan ............................ 61-26576

[51] Int. Cl.[4] ........................................ H04M 5/783
[52] U.S. Cl. ................................ 360/10.2; 360/73.05; 360/77.14
[58] Field of Search ...................... 360/10.2, 73.77

[56] References Cited

U.S. PATENT DOCUMENTS

| | | | |
|---|---|---|---|
| 4,486,795 | 12/1984 | Naito | 360/77 |
| 4,594,618 | 6/1986 | Kozuki et al. | 360/73 |
| 4,618,899 | 10/1986 | Doutsubo | 360/73 |
| 4,663,673 | 5/1987 | Doutsubo | 360/10.2 X |
| 4,680,648 | 7/1987 | Takayama | 360/10.2 |
| 4,682,247 | 7/1987 | Doutsubo | 360/10.2 |

*Primary Examiner*—Aristotelis M. Psitos
*Attorney, Agent, or Firm*—Lewis H. Eslinger

[57] ABSTRACT

In tape transport apparatus for use with an 8-mm video tape recorder having an automatic track following system, during reproduction at a variable tape speed, a tracking error signal formed on the basis of a frequency component of a reproduced pilot signal is sampled and held once per one field. The sampled and held output is compared with a reference value, the running state of the tape is positively identified on the basis of the comparison, and tracking control responsive to the identified running state is carried out. The apparatus has the additional capability of skipping pilot signal frequencies in a quasi-locked state to assist in obtaining a locked state.

4 Claims, 14 Drawing Sheets

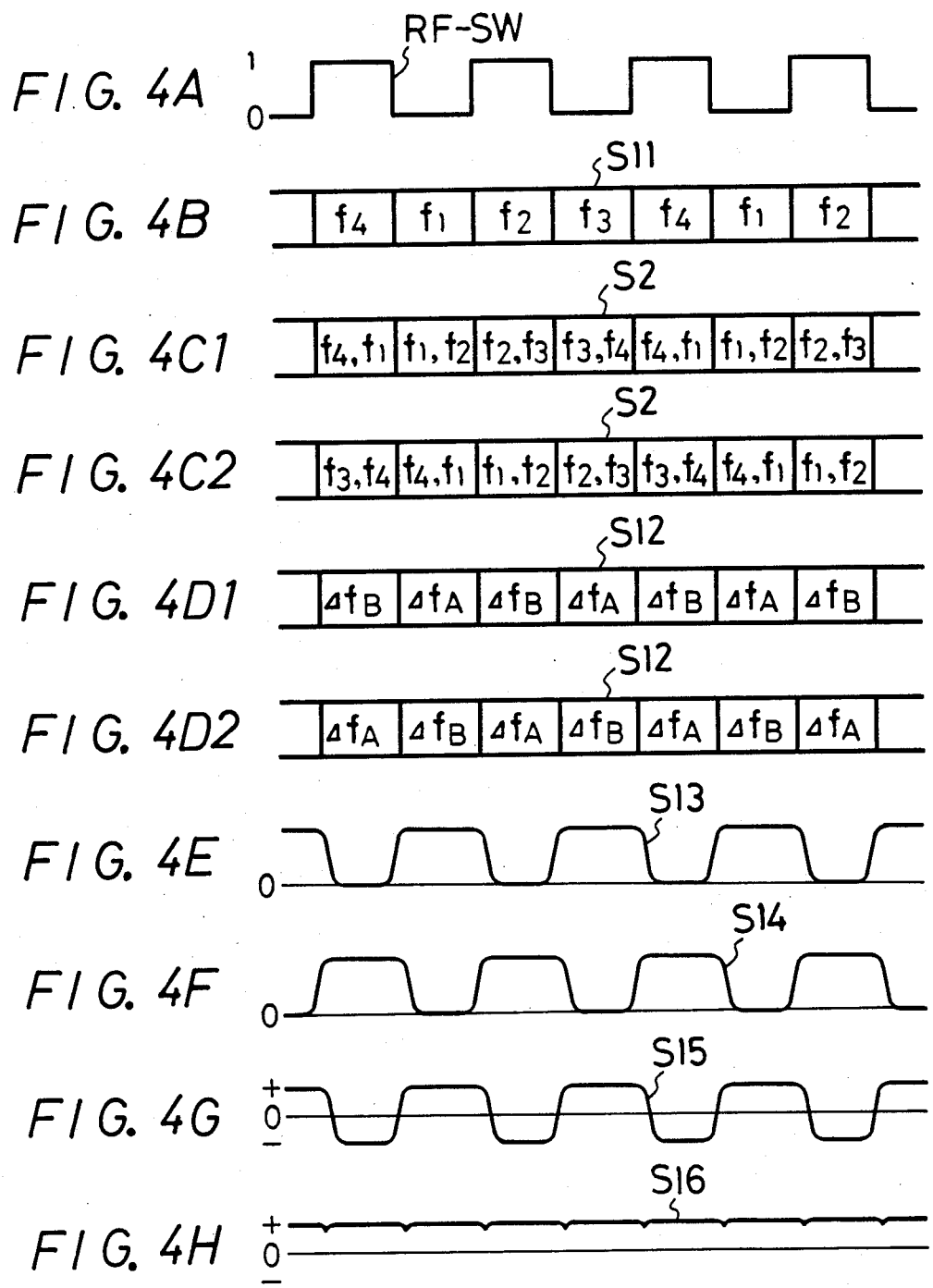

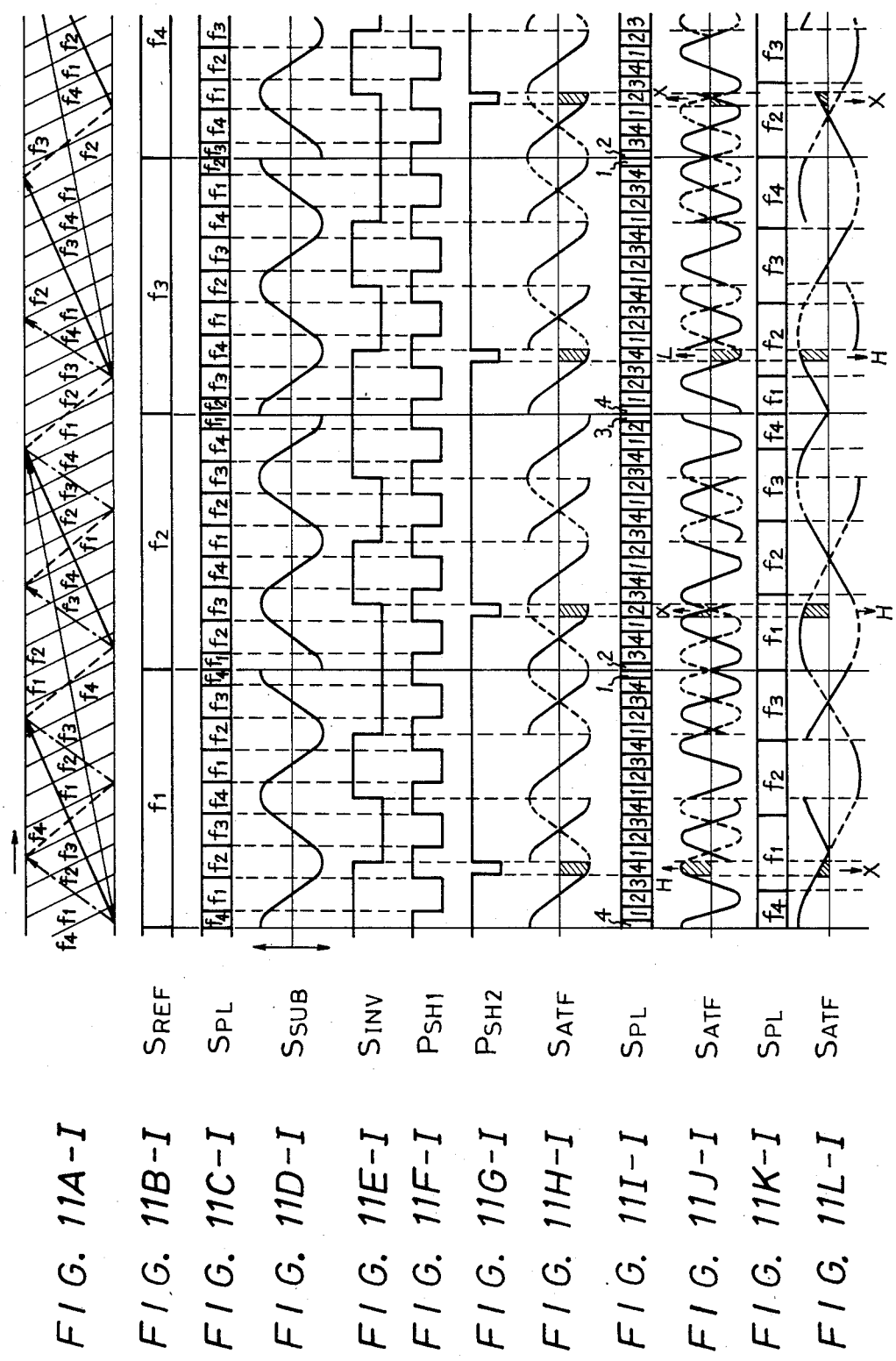

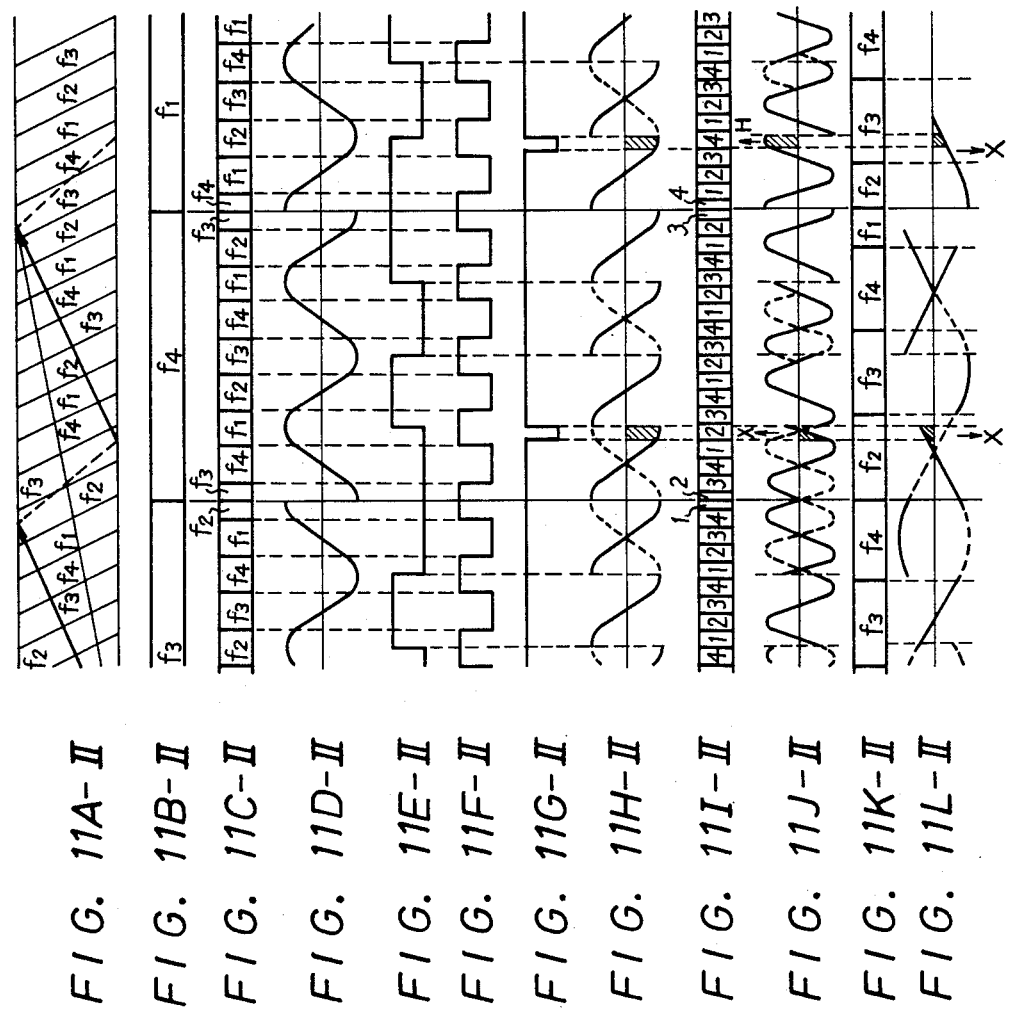

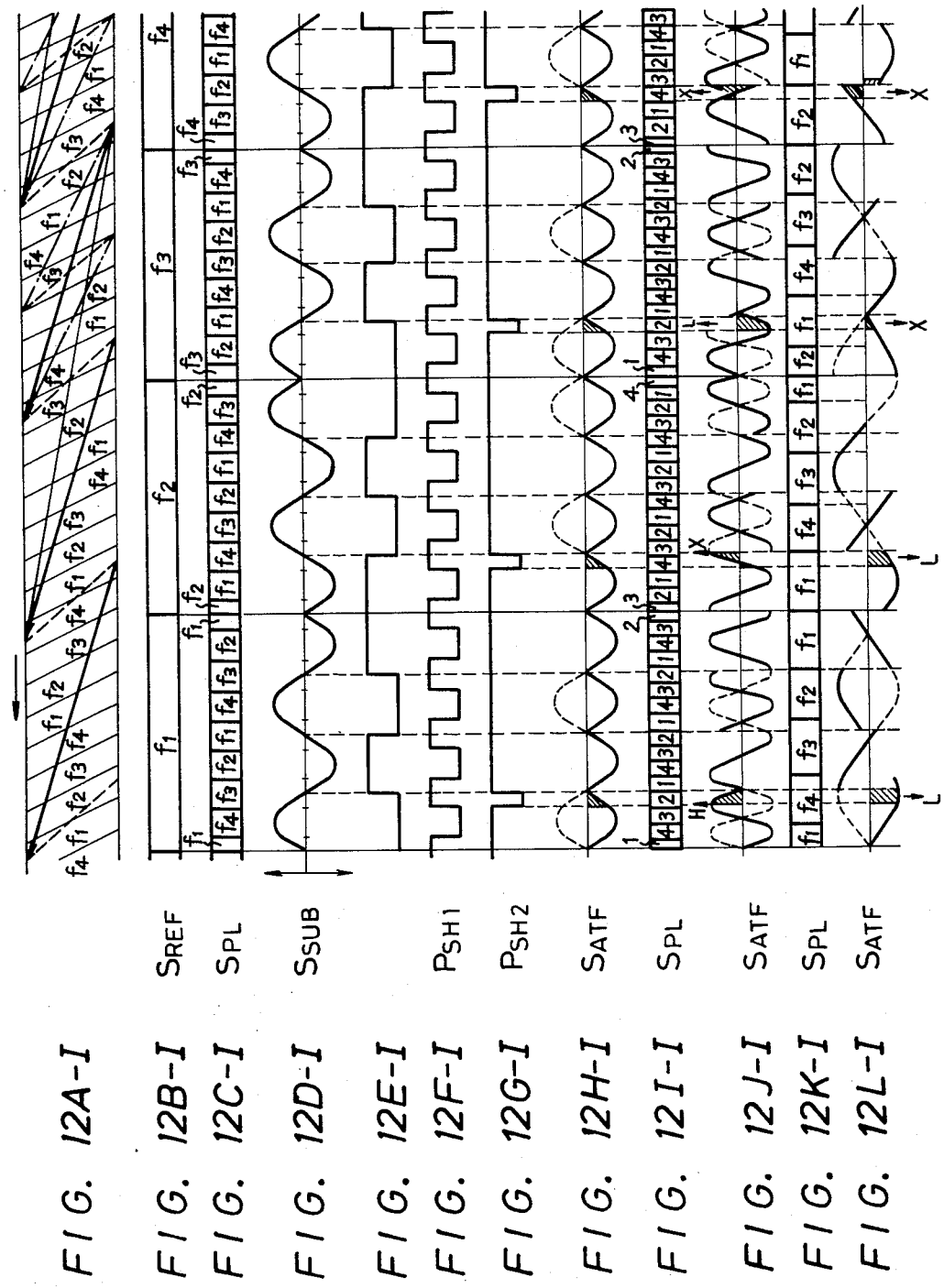

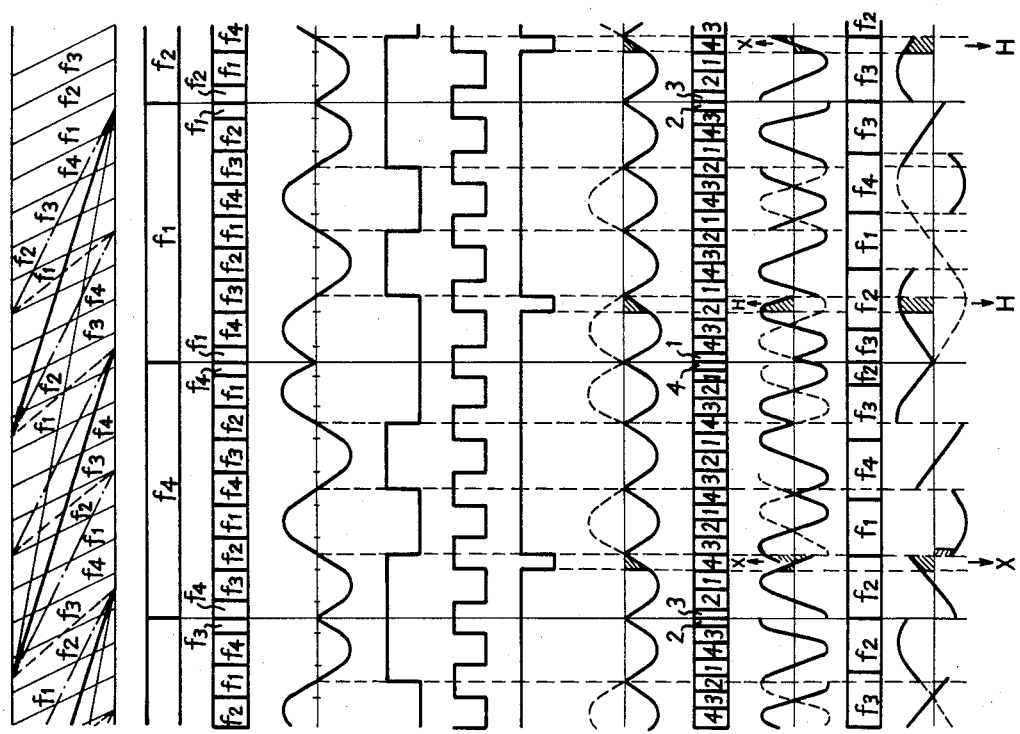

TRACKING CONTROL APPARATUS USING PILOT SIGNALS OF DIFFERENT FREQUENCIES

BACKGROUND OF THE INVENTION

1. Field of the Invention

This invention relates to tracking control apparatus and, more particularly, to novel and highly-effective tracking control apparatus for use in an automatic track following system (hereinafter referred to as an ATF system) in which pilot signals having different frequencies are cyclically recorded together with a video signal on slant recording tracks arranged sequentially on a record medium. During reproduction, the frequencies of the reproduced pilot signals are detected to enable a reproducing head to follow a predetermined track.

2. Description of the Prior Art

ATF systems including conventional tracking control apparatus are now widely used in 8-mm video tape recorders (VTRs) and the like. One example of conventional tracking control apparatus incorporated in an ATF system is described below. In prior art apparatus of this type, for reasons explained in detail below it frequently takes too long for a noise band produced in certain playback modes to become minimized and stabilized.

OBJECTS AND SUMMARY OF THE INVENTION

An object of the present invention is to provide improved tracking control apparatus.

Another object of the invention is to provide tracking control apparatus in which even in a high speed reproduction mode, the noise band can be minimized and fixed in location in an acceptably short time.

It is a further object of the invention to provide improved running condition identifying apparatus for use with an 8-mm video tape recorder having an ATF (automatic track following) system, the apparatus being so constructed that, when reproduction at a variable tape speed such as Cue/Review is carried out in a running condition corresponding to the running condition employed during the recording of the signal that is being reproduced, the locking condition of the tracking servo can be appropriately identified and the processing necessary to achieve the locking condition can be carried out.

According to one aspect of the present invention, there is provided recording/reproducing apparatus wherein pilot signals of different frequencies are recorded cyclically and in a predetermined sequence on parallel record tracks on a moving record medium together with a video signal organized in a series of fields and are employed to control tracking of a reproducing head of said apparatus during reproduction; said apparatus comprising: means operable in a reproduction mode of said apparatus for moving said record medium at a reproducing speed higher than a normal speed; multiplying means for multiplying reproduced pilot signals with reference pilot signals switched in accordance with a head switching signal, thereby generating a tracking error signal; sample and hold means for sampling and holding said tracking error signal at predetermined points of a plurality of said fields; comparator means for effecting a comparison of the output of said sample and hold means with a reference signal and producing a comparator output signal having a state that depends on said comparison; and detector means responsive to said comparator output signal for effecting detection of a predetermined running condition of said record medium.

These and other objects, features and advantages of the present invention will become apparent from the following detailed description of the preferred embodiment thereof taken in conjunction with the accompanying drawings, throughout which like reference numerals designate like elements and parts.

BRIEF DESCRIPTION OF THE DRAWINGS

FIGS. 4A to 4H are diagrams respectively used to explain the ATF system shown in FIG. 2;

FIG. 11A to 11L are respectively diagrams (in parts I and II) used to explain forward direction reproduction at a tape speed nine times the normal tape speed;

FIGS. 12A to 12L are respectively diagrams (in parts I and II) used to explain reverse direction reproduction at a tape speed seven times the normal tape speed;

DESCRIPTION OF THE PREFERRED EMBODIMENT

Figure 1:
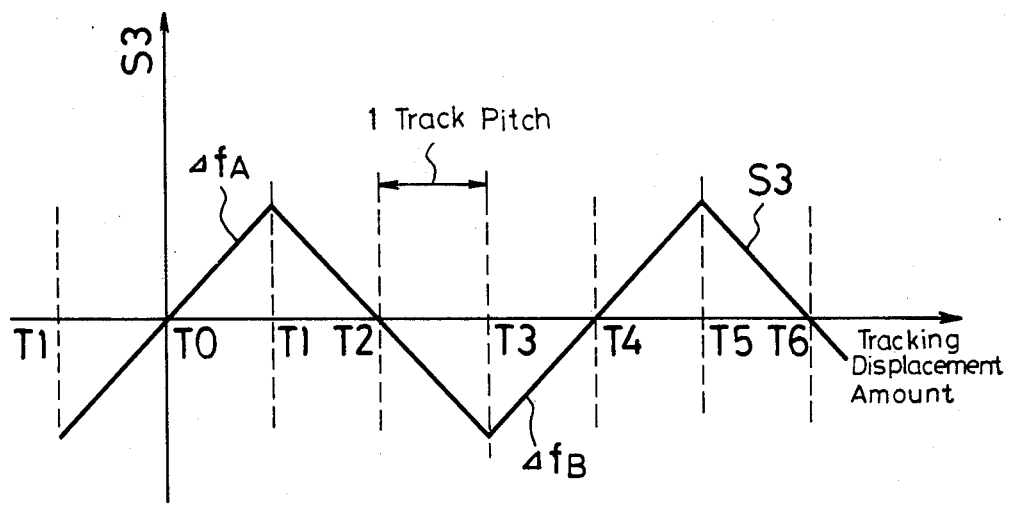
FIG. 1 is a graph showing a control characteristic of an ATF (automatic track following) system.

In the tracking control apparatus of the ATF system, pilot signals respectively having four different frequencies are sequentially recorded on recording tracks on a record medium such as a magnetic tape. The tracking state indicated by the relationship of a tracking error signal to the displacement of a tracking position is shown in FIG. 1. Specifically, if the track pitch and the width of a reproducing head are substantially equal, an error signal S3 becomes zero at a phase locking point T0. At that time, the reproducing head is controlled so as to be located in the correct tracking state. On the other hand, if the reproducing head is displaced in the positive direction (to the right in FIG. 1), the error signal S3 increases (i.e., has a positive slope) until the tracking displacement becomes one track pitch, that is, the head arrives at an adjacent track T1. The error signal S3 has a maximum value at track T1. Thereafter, in a range from T1 to T3 in which the tracking displacement increases by two additional track pitches, the error signal S3 decreases (i.e., has a negative slope) and becomes zero at track T2 and then assumes a negative value. The error signal S3 has a minimum value at track T3. When the tracking displacement increases so that the reproducing head is beyond track T3, the error signal S3 has a positive slope and increases again during the period of two track pitches (crossing zero at track T4). Accordingly, the change of the error signal S3 is such that during tracking displacement from track T0 to track T4, the error signal S3 changes through one cycle. If the tracking displacement thereafter continues to increase, the cyclical change in the signal S3 is repeated every four track pitches.

When the error signal S3 changes as described above, the tracking control system controls the reproducing head so that, when the error signal S3 has a positive value near the phase locking position T0, the displacement of the tracking position is decreased; and, when the error signal S3 has a negative value near the phase locking position T0, the displacement of the tracking position is decreased. Accordingly, the reproducing head is locked to the phase locking position T0 at which the error signal S3 becomes zero. Of course, the error signal S3 becomes zero also at phase position T2. In this case, however, if the error signal S3 is very slightly increased (i.e., if the reproducing head moves slightly to the right from phase position T2 in FIG. 1) or decreased (i.e., if the reproducing head moves slightly to the left from phase position T2 in FIG. 1), the reproducing head is controlled so as to increase the tracking displacement from point T2. Hence, the phase position T2 can not become a stable point (this point is referred to as an oscillation point).

Figure 2:
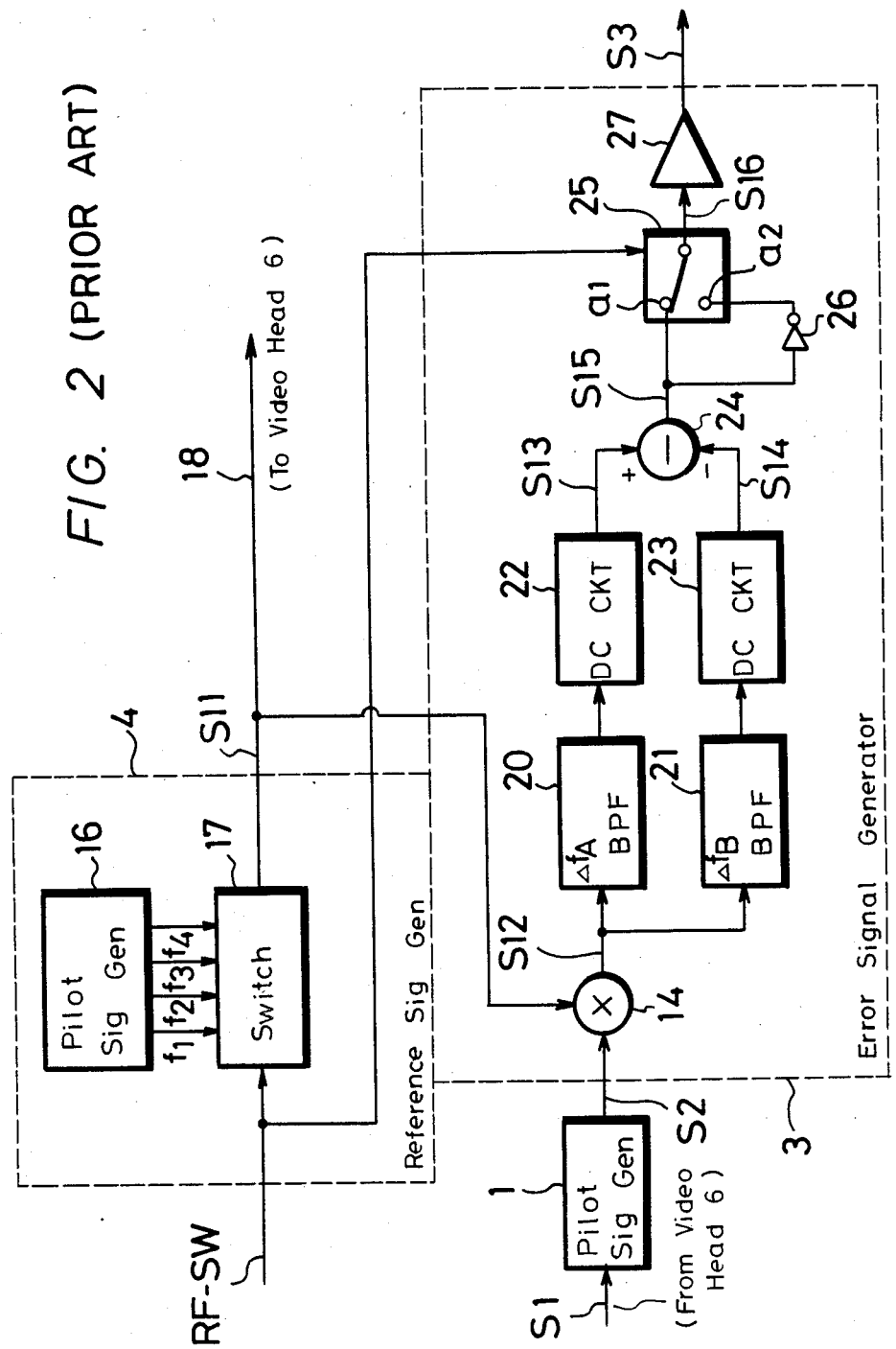
FIG. 2 is a block diagram showing an example of a tracking control apparatus of a conventional ATF system.

FIG. 2 shows conventional tracking control apparatus for generating an error signal S3 that changes as described above, and FIGS. 1 and 3 illustrate the operation of the apparatus.

In FIG. 2, a signal S1, which is a portion of an output reproduce by the rotary video head 6 (FIG. 3) used as a recording and reproducing head, is supplied to a pilot signal detecting circuit 1. The circuit 1 is configured as a low pass filter and generates a signal S2. The signal S2 is a reproduced pilot signal that has been previously recorded on a magnetic tape 5 (FIG. 3) used as a record medium. The reproduced pilot signal S2 is supplied to an error signal generating circuit 3. The error signal generating circuit 3 generates the tracking error signal S3 (FIGS. 1 and 2) under the control of a reference signal generating circuit 4.

Figure 3:
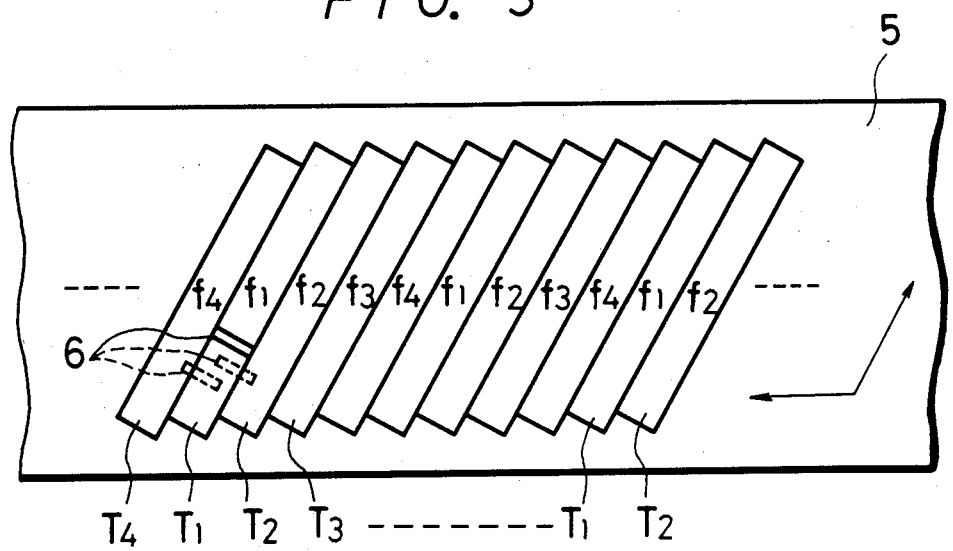
FIG. 3 is a diagram showing one example of a recording pattern employed by apparatus incorporating an ATF system.

On the tape 5, as FIG. 3 shows, there are cyclically and repeatedly formed groups of four oblique video tracks T1, T2, T3 and T4 in close, preferably contiguous, relation. An integral number, for example four, pilot signals f1, f2, f3 and f4 that are different in frequency are recorded sequentially together with a video signal. The effective width of the video recording and reproducing head 6 is selected to be substantially equal to the width of each of the tracks T1 to T4. Accordingly, when the reproducing head 6 correctly follows a given previously recorded track, for example one of the tracks T1 as shown by a solid line in FIG. 3, the pilot signal recorded on that track is reproduced, almost to the exclusion of the pilot signals recorded on adjacent tracks. In other words, the reproduced pilot signal consists essentially of only one frequency (f1 in the example). On the other hand, if the reproducing head 6 is displaced to the right or left from the corresponding track, as shown by broken lines in FIG. 3, the pilot signal f2 or f4 recorded on the adjacent track on the right or left side is reproduced together with the pilot signal f1. In addition, the magnitudes of the respective pilot frequency components are proportional to the length of the reproducing head that overlaps the several tracks.

The frequencies f1 to f4 are in the lower side-band area of the color signal component which is converted to a lower band frequency (600 to 700 kHz) and are selected so that in the four tracks T1 to T4 which are formed cyclically, the frequency difference between the pilot signal of, for example, the odd track T1 and T3 and the pilot signal of the adjacent track on the right thereof is $\Delta f_A$, while the frequency difference between the pilot signal of the track T1 or T3 and the pilot signal of the adjacent track on the left thereof is $\Delta f_B$. Also, the frequency difference between the pilot signal of the even track T2 or T4 and the pilot signal of the adjacent track on the right thereof is $\Delta f_B$, while the frequency difference between the pilot signal of the track T2 or T4 and the pilot signal of the adjacent track on the left thereof is $\Delta f_A$.

Accordingly, when the reproducing head 6 reproduces the odd track T1 or T3, if the signal component having the frequency difference of $\Delta f_A$ exists as the frequency component of the pilot signal contained in the reproduced signal, it can be seen that the reproducing head 6 is displaced to the right. If on the other hand there exists the signal component having the frequency difference of $\Delta f_B$, it can be seen that the reproducing head 6 is displaced to the left. Further, if there exists neither the signal component having the frequency difference of $\Delta f_A$ nor the signal component having the frequency difference $\Delta f_B$, it can be seen that the reproducing head 6 is placed in the correct tracking position.

In like manner, when the reproducing head 6 reproduces the even track T2 or T4, if there exists the signal component having the frequency difference of $\Delta f_B$ as the frequency component of the pilot signal contained in the reproduced signal, it can be seen that the reproducing head 6 is displaced to the right. If on the other hand there exists the signal component having the frequency difference of $\Delta f_A$, it can be seen that the reproducing head 6 is displaced to the left.

In this example, with respect to the frequencies f1, f2, f3 and f4 allocated to the first, second, third and fourth video tracks T1, T2, T3 and T4, the frequency f1 is selected as 102 kHz, f2 as 116 kHz, f3 as 160 kHz and f4 as 146 kHz. Accordingly, the difference frequencies $\Delta f_A$ and $\Delta f_B$ are respectively $$\Delta f_A = |f1-f2| = |f3-f4| = 14 \text{ kHz} \quad (1)$$

$$\Delta f_B = |f2-f3| = |f4-f1| = 44 \text{ kHz} \quad (2)$$

The reproduced signal S1 from the reproducing head 6 and having the content as mentioned above is supplied to the pilot signal detecting circuit 1 (FIG. 2) having the low pass filter configuration. The reproduced pilot signal S2, which results from reproducing the pilot signal contained in the reproduced signal S1, is supplied from the pilot signal detecting circuit 1 to a multiplying circuit 14 as a first multiplying input. The multiplying circuit 14 is supplied with a reference pilot signal S11 from the reference signal generating circuit 4 as a second multiplying input.

The reference signal generating circuit 4 comprises a pilot signal generating circuit 16 which generates four kinds of the pilot frequency outputs having the frequencies f1 to f4 and a switching circuit 17 which receives the outputs from the generating circuit 16 and a head switching pulse RF−SW (FIG. 4A) which changes its logic level each time one of two video heads which scan the tape 5 (FIG. 3) is switched in accordance with the rotation of a rotary drum (not shown). In this example, the switching circuit 17 includes a quaternary counter circuit (not shown) which executes a counting operation each time the level of the head switching pulse RF−SW is changed. Accordingly, this counter circuit repeatedly generates gating signals corresponding to the first to fourth tracks T1 to T4 in sequence. When the gates of the switching circuit 17 are respectively opened by the gating signals for the tracks T1 to T4, the outputs of the pilot frequencies f1 to f4 from the pilot signal generating circuit 16 are sequentially delivered as a reference pilot signal S11 shown in FIGS. 2 and 4B.

The reference pilot signal S11 developed at the output terminal of the switching circuit 17 is supplied through a signal line 18 to the video head 6 as a recording pilot signal during recording as shown in FIG. 2. Consequently, during a period in which the video head 6 scans the first to fourth tracks T1 to T4, the pilot signals of the corresponding frequencies f1 to f4 are sequentially supplied to the video head 6 and thereby recorded on the respective tracks 1 to T4.

As noted above, the reproduced pilot signal S2 developed at the output terminal of the pilot signal detecting circuit 1 during a period in which the video head 6 sequentially scans the first to fourth tracks T1 to T4 is multiplied by the reference pilot signal S11 which is generated at the output terminal of the switching circuit 17 in synchronism with the corresponding reproduced track. If a tracking error exists, the multiplied output S12 generated by the multiplying circuit 14 has a signal component the frequency of which is equal to the difference between the frequency component contained in the reproduced pilot signal S2 and the frequency of the reference pilot signal S11 (in practice, this multiplied output S12 also contains other signal components, such as a sum frequency component and so on). The multiplied output S12 is supplied to first and second difference frequency detecting circuits 20 and 21, each of which is formed of a band pass filter. The first difference frequency detecting circuit 20 extracts the signal component having the difference frequency of $\Delta f_A$ (Eq. (1) above), when it is contained in the multiplied output S12. This signal component is converted to a DC component by a DC circuit 22 having a rectifying circuit configuration which then generates a first error detecting signal S13 having a DC level. Similarly, the second difference frequency detecting circuit 21 extracts the signal component having the difference frequency $\Delta f_B$ (Eq. (2) above), when it is contained in the multiplied output S12, and a second error detecting DC signal S14 is generated by a DC circuit 23.

When the video head 6 traces the first, second, third and fourth tracks T1, T2, T3 and T4, the switching circuit 17 generates the reference pilot signals S11 having the frequencies f1, f2, f3 and f4 (FIG. 4B) at times corresponding to the respective tracks T1, T2, T3 and T4. If the head 6 is displaced to the right, the reproduced pilot signal S2 obtained on the basis of the reproduced signal S1 from the video head 6 contains the pilot signals having the frequencies f1 and f2; f2 and f3; f3 and f4; and f4 and f1 in successive tracking periods (FIG. 4C1). Accordingly, the multiplied output S12 sequentially contains the difference frequencies $\Delta f_A (=|f1-f2|)$, $\Delta f_B (|f2-f3|)$, $\Delta f_A (=|f3-f4|)$ and $\Delta f_B (=|f4-f1|)$ as shown in FIG. 4D1. If on the other hand the head 6 is displaced to the left, the reproduced pilot signal S2 contains the pilot signals having the frequencies f4 and f1; f1 and f2; f2 and f3; and f3 and f4 in successive tracking periods (FIG. 4C2). Accordingly, the multiplied output S12 sequentially contains the difference frequencies $\Delta f_B (=|f4-f1|)$, $\Delta f_A (=|f1-f2|)$, $\Delta f_B(=|f2-f3|)$ and $\Delta f_A(=|f3-f4|)$ as shown in FIG. 4D2.

FIGS. 4E and 4F illustrate the case where the video head 6 is displaced to the right. First and second error detecting signals S13 and S14 whose DC levels rise up from the zero level each time the head 6 changes the track to be scanned are generated by the DC circuits 22 and 23.

The first and second error detecting signals S13 and S14 are respectively supplied to a subtracting circuit 24 as an adding input and a subtracting input so that the subtracting circuit 24 generates a subtracted output S15 which is changed, as shown in FIG. 4G, in an AC manner each time the first and second error detecting signals S13 and S14 are alternately generated. The subtracted output S15 is supplied directly to a first input terminal a1 of a changeover switching circuit 25, while it is inverted in polarity by an inverting circuit 26 and then fed to a second input terminal a2 of the switching circuit 25. The changeover switching circuit 25 is connected to the first input terminal a1 in response to the head switching pulse RF−SW when the video head 6 traces, for example, the odd tracks T1 and T3, while it is connected to the second input terminal a2 when it traces the even tracks T2 and T4 to thereby generate a DC level output S16 (FIG. 4H). The signal S16 has a positive polarity when the video head 6 is displaced to the right and negative polarity when the video head 6 is displaced to the left. In either case, the signal S16 has a magnitude corresponding to the absolute value of the displacement of the video head 6. The DC level output S16 is supplied to an output amplifying circuit 27 formed of a DC amplifier. The amplifying circuit 27 produces as its output the tracking error signal S3.

Let it be assumed that the video head 6 is displaced to the right. Then, when the track to be reproduced is the odd track T1 or T3, the signal component having the difference frequency $\Delta f_A$ appears at the output terminal of the multiplying circuit 14 so that the output from the first difference frequency detecting circuit 20 is supplied to the subtracting circuit 24. Since at that time changeover switching circuit 25 is connected to the first input terminal a1, there is delivered therefrom a tracking error signal S3 of positive DC level. On the other hand, when the track to be reproduced is the even track T2 or T4, the signal component having the difference frequency $\Delta f_B$ appears at the output terminal of the multiplying circuit 14 so that the output from the second difference frequency detecting circuit 21 is supplied to the subtracting circuit 24. Since at that time the changeover switching circuit 25 is connected to the second input terminal a2, the output of negative polarity from the subtracting circuit 24 is inverted in polarity by the inverting circuit 26 and then delivered as a tracking error signal S3 of positive DC level.

When the video head 6 is displaced to the left, then the tracking error signal S3 has negative polarity.

The tracking error signal S3 is supplied to a phase servo circuit (not shown) of a capstan servo loop as a correcting signal so as to decrease the tape running speed when the DC level is positive and increase the tape running speed when the DC level is negative. The phase displacement between the video head and the reproduced track is continuously corrected, thus realizing correct ATF tracking servo.

In principle, when the video head 6 correctly tracks the respective tracks, no difference frequency component is generated at the output terminal of the multiplying circuit 14. However, in practice, even under this correct tracking state, the pilot signals of the adjacent tracks on either side of the scanned track are produced in the reproduced signal S1 by the video head 6.

That is, in practice, when no guard band is provided between the adjacent tracks, each newly recorded track partly overlaps the last track recorded and in turn is partly overlapped by the next track recorded. Accordingly, the width of the video head 6 exceeds that of each of the respective tracks T1 to T4; and, when the video head 6 correctly tracks each track, the video head 6 partly overlaps both the left and right adjacent tracks. As a result, the video head 6 reproduces the pilot signals of the left and right adjacent tracks, and the error detecting signals S13 and S14 (FIGS. 4E and 4F) are generated from the DC circuits 22 and 23, respectively.

On the other hand, when a guard band of a usual width is provided between adjacent tracks, although the width of the video head 6 is almost identical to the width of the tracks, the pilot signals recorded on the left and right adjacent tracks are mixed into the reproduced signal of the video head 6 as a cross-talk signal. Consequently, the error detecting signals S13 and S14 contain as signal components the difference frequencies corresponding to the cross-talk signals.

The pilot signals mixed into the reproduced output S1 of the video head 6 from the adjacent tracks are simultaneously developed at the output terminal of the multiplying circuit 14 as the signal components of the difference frequencies $\Delta f_A$ and $\Delta f_B$ so that when the error detecting signals S13 and S14 are subtracted by the subtracting circuit 24, each cancels out the other. In addition, when the video head 6 correctly follows the tracks, the video head 6 is located symmetrically with respect to the left and right adjacent tracks so that the lengths of the head 6 projecting over the left and the right adjacent tracks are substantially equal to each other and the magnitudes of the cross-talk components for the left and right adjacent tracks are also substantially equal to each other. As a result, the calculated output S15 becomes equivalent to the case where the width of the video head 6 is assumed to be substantially equal to the width of the track. Accordingly, the tracking operation of the tracking control apparatus can be protected against the influence of the difference frequency components which are generated simultaneously from the right and left adjacent tracks because the width of the video head 6 is larger than the track width or which are due to the cross-talk component.

In the error signal generating circuit 3, the signal components of the difference frequencies $\Delta f_A$ and $\Delta f_B$ are obtained, and the error detecting signals S13 and S14 are obtained on the basis of these signal components. Alternatively, the levels of the reproduced pilot signals having the frequencies f1 to f4 are respectively detected by reproduced pilot signal detecting circuits, each having a band pass filter configuration, and the error detecting signals S13 and D14 are obtained on the basis of the detected outputs of the detecting circuits.

When the video head 6 reaches the phase locking position T0 (FIG. 1) at which the video head 6 correctly follows the track, the content of the reproduced pilot signal S2 is the frequency f1 so that neither of the difference frequencies $\Delta f_A$ and $\Delta f_B$ is contained in the output S12 of the multiplying circuit 14. If the reproducing head 6 is displaced in the positive direction from this state, the reproducing head 6 comes to oppose the track T2 with the result that the component of frequency f2 is produced in the reproduced pilot signal S2. Also, in response to increasing tracking displacement, the area in which the reproducing head 6 opposes the track T2 gradually increases then gradually decreases, and the component of frequency f2 gradually increases, passes through a maximum value and then gradually decreases. As a result, as the head 6 is moved from the phase lock position T0 through the track position T1 to the track position T2, the difference frequency component $\Delta f_A$ of the output S12 from the multiplying circuit 14 gradually increases, passes through a maximum value and then gradually decreases. In response thereto, the value of the tracking error signal S3 increases in the positive direction, passes through a maximum value and then decreases, thus presenting the change shown in FIG. 1.

Thereafter, when the reproducing head 6 comes to oppose the track T4, the frequency component f4 occurs in the reproduced pilot signal S2. Also, as the head 6 is moved from the track position T2 through the track position T3 to the track position T4, the magnitude of the frequency component f4 gradually increases, reaches a maximum value and then gradually decreases. In consequence, the frequency component $\Delta f_B$ is produced in the output S12 of the multiplying circuit 14. Thus, as the reproducing head 6 is moved from the track position T2 through the track position T3 to the track position T4, the error signal S3 decreases, passes through a minimum value and then increases as described above in relation to FIG. 1.

Figure 5:
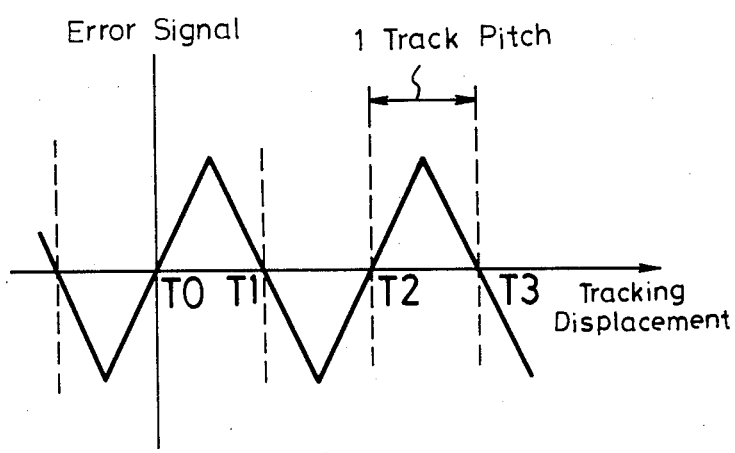
FIG. 5 is a graph showing the control characteristic of a CTL (control) tracking servo system.

As described above, in the tracking control apparatus of the four-frequency ATF system, one phase locking position is provided for every four tracks. This means that, for example, upon actuation of the VTR the servo control apparatus takes a long time to be set in the locked state (that is, it has a long lock-in time). In the prior art, a so-called CTL tracking servo system is used in which a control signal (CTL signal) is recorded on the tape along its tape moving direction by a stationary head as a pulse signal whose polarity is inverted at every vertical synchronizing signal of a television signal (accordingly, at every track) and the tracking control is carried out by using this CTL signal. In this case, the change of the error signal relative to the tracking displacement is as shown in FIG. 5 in association with FIG. 1. As FIG. 5 shows, when the tracking displacement occurs through the phase positions T0, T1, T2, T3, . . . , the phase locking points T0, T2, . . . , and the oscillation points T1, T3, . . . , are produced alternately. This means that one phase locking point is generated per two tracks. Accordingly, when the control characteristics of the CTL tracking servo system shown in FIG. 5 and those of the ATF system shown in FIG. 1 are compared with each other, if the time constant characteristics of the servo are selected to be equal to each other, it will be seen from a probability standpoint that the lock-in time of the ATF system is twice as long as the lock-in time of the CTL system.

For this reason, the assignee of the present application has previously proposed a tracking control apparatus (disclosed in Japanese laid-open patent application No. 60-15848) in which the lock-in time can be reduced in the ATF system. According to this previously proposed tracking control apparatus, when the difference frequency component produced in the multiplied output of the reproduced pilot signal and the reference pilot signal does not fall within a predetermined lock-in range, a lock-in error detecting signal is generated from a lock-in error detecting circuit and on the basis of the detected output, the cyclic order of the reference pilot signals is skipped by a predetermined number of stages by a skip control circuit. According to such tracking control apparatus, if the reproducing head is outside the lock-in range of the tracking control apparatus, the cyclic order of the frequencies of the reference pilot signals is skipped by a predetermined number of stages so that a phase servo system of a video tape recorder can be locked by the tracking control apparatus in a relatively short time.

Further, in the above mentioned 8-mm VTR, the normal recording (SP (standard play) mode) and the extended recording (LP (long play) mode) are made available by switching the running speed of the magnetic tape.

In the ATF-system VTR having a plurality of recording modes as described above, in the reproduction mode a periodic fluctuation component of a tracking error signal formed on the basis of the frequency component of the pilot signal reproduced from a record medium is utilized to identify the recording mode. This is disclosed in Japanese laid-open patent application No. 60-136932. In the reproduction mode, a speed servo corresponding to the recording mode is applied to a tape transport system.

When the tape is transported at a speed different from a normal reproducing speed, it is usual that a noise band appears in the reproduced picture. A control operation must be carried out to make this noise band inconspicuous on the reproduced picture. To this end, the assignee of the present application has previously proposed a video signal reproducing apparatus (disclosed in Japanese laid-open patent application No. 57-202185) in which a tracking control apparatus of the four-frequency ATF system controls this noise band. In this previously proposed video signal reproducing apparatus, since the switching period of the reference pilot signal is matched with the pilot signal to be reproduced, the phase of the reproduced signal can be adjusted to an optimum value, thus minimizing the noise band which occurs when the head moves across the track.

However, when the reproduction speed of the tape becomes high, the reference pilot signal must also be switched at high speed, making the control operation of its switching very complicated. Further, in this high speed playback mode, a signal delay is caused by a pilot signal processing system circuit so that it is difficult to divide the reference pilot signal for detecting the locking state in a time division manner (see the Japanese application No. 57-202185). As a result, when the mode of the reproducing apparatus is changed from, for example, the normal playback mode to the high speed playback mode, it is possible for the head position to reach the oscillation point, depending on the phase of the rising edge. In such a case, it takes longer than usual for the noise band to stabilize.

Figures 6A, 6B, 6C, 6D, 6E, 6F, 6G, 6H:
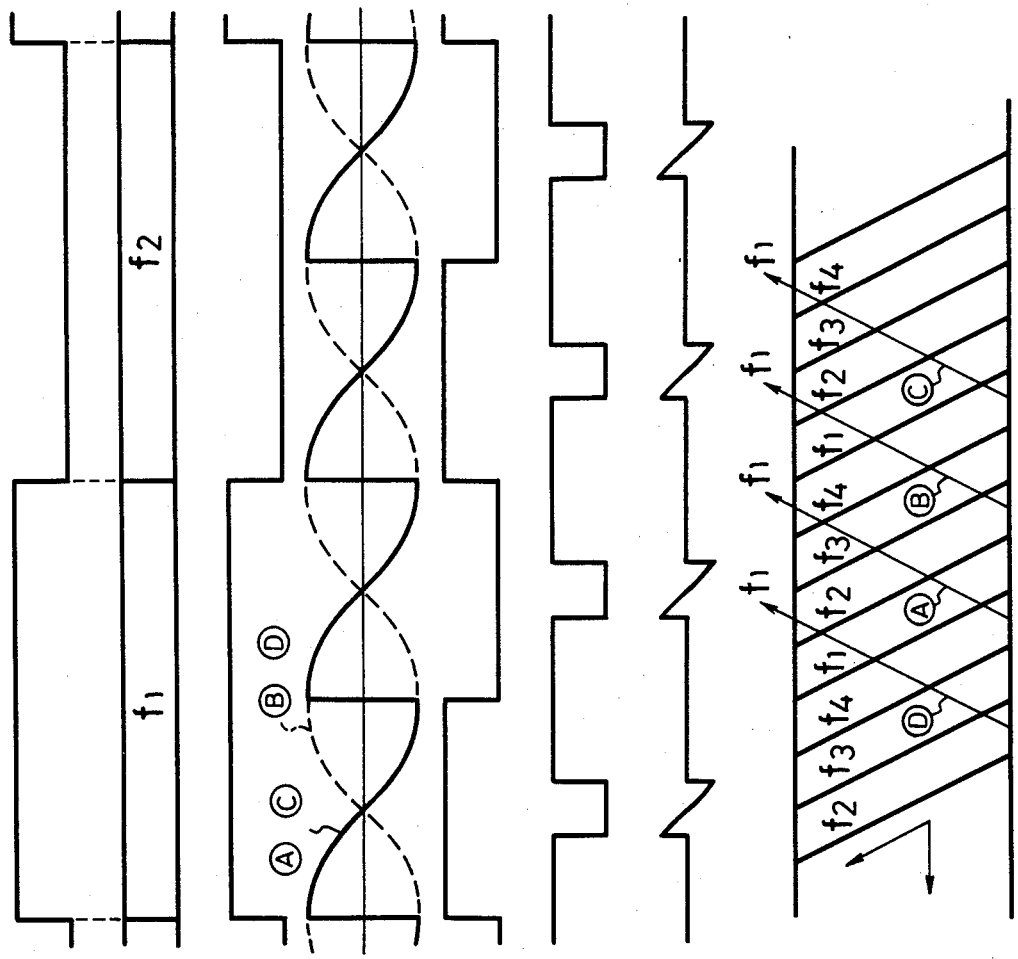
FIGS. 6A to 6H are diagrams respectively used to explain a phase-locked point.

FIGS. 6A to 6H are a diagrammatic representation of one example of this phase locked state. Let it be assumed that the reference pilot signal (FIG. 6B) is switched in the sequential order f1, f2, . . . , in synchronism with, for example, a head switching pulse signal (FIG. 6A). Also, let it be assumed that the reproduction by the VTR is carried out at a speed five times as high as the normal playback speed and that the locus of the head becomes one of the loci shown by A, B, C and D, each enclosed within a circle in FIG. 6H. The portion of a tracking error signal near a zero-cross point (shown by a solid line or broken line in FIG. 6D) which is sequentially switched by a polarity inverting pulse signal (FIG. 6E) is sampled and held, as shown in FIG. 6G, by a servo error sampling pulse signal (FIG. 6F), and the tracking signal is provided by the thus sampled and held signal. If the locus of the head is as shown by A or C, each enclosed with a circle in FIG. 6H, and if at that time the tracking error signal is obtained as shown by a solid line in FIG. 6D, the noise band on the picture screen is stabilized as it is and the tracking of the head is locked. On the other hand, if the tracking error signal is as shown by a broken line in FIG. 6D, the head is placed in the so-called quasi-locked state in which the picture on the display is good because the azimuth of the reproducing head is equal to that of the recorded track but the tracking of the head is at the oscillation point. Only after the head is moved so that the locus of the head becomes as shown by the circled B or D in FIG. 6H does the tracking of the head become locked. The noise band is thus not initially stabilized and it takes a disconcertingly long time until the noise band becomes stabilized.

Another problem arises in the VTR of the ATF system which carries out the reproduction operation so that the periodic fluctuation component of the tracking error signal is utilized to identify the recording mode so as to apply the recording speed servo to the tape transport system during playback. During playback at variable tape speed, as in high speed reproduction (so-called Cue/Review) in the forward or reverse direction, the frequency of the reference pilot signal used to form a tracking error signal from the pilot signal must be switched in accordance with the reproduction speed. As earlier noted, time division of the reference pilot signal is very difficult. Accordingly, in the prior art, when the tape speed is variable during reproduction, the recording mode can not be identified and the phase lock point can not be detected so that the recording mode and the reproduction mode fail to coincide. There is then the problem that reproduction with a variable tape speed can not be carried out as desired.

Figure 7:
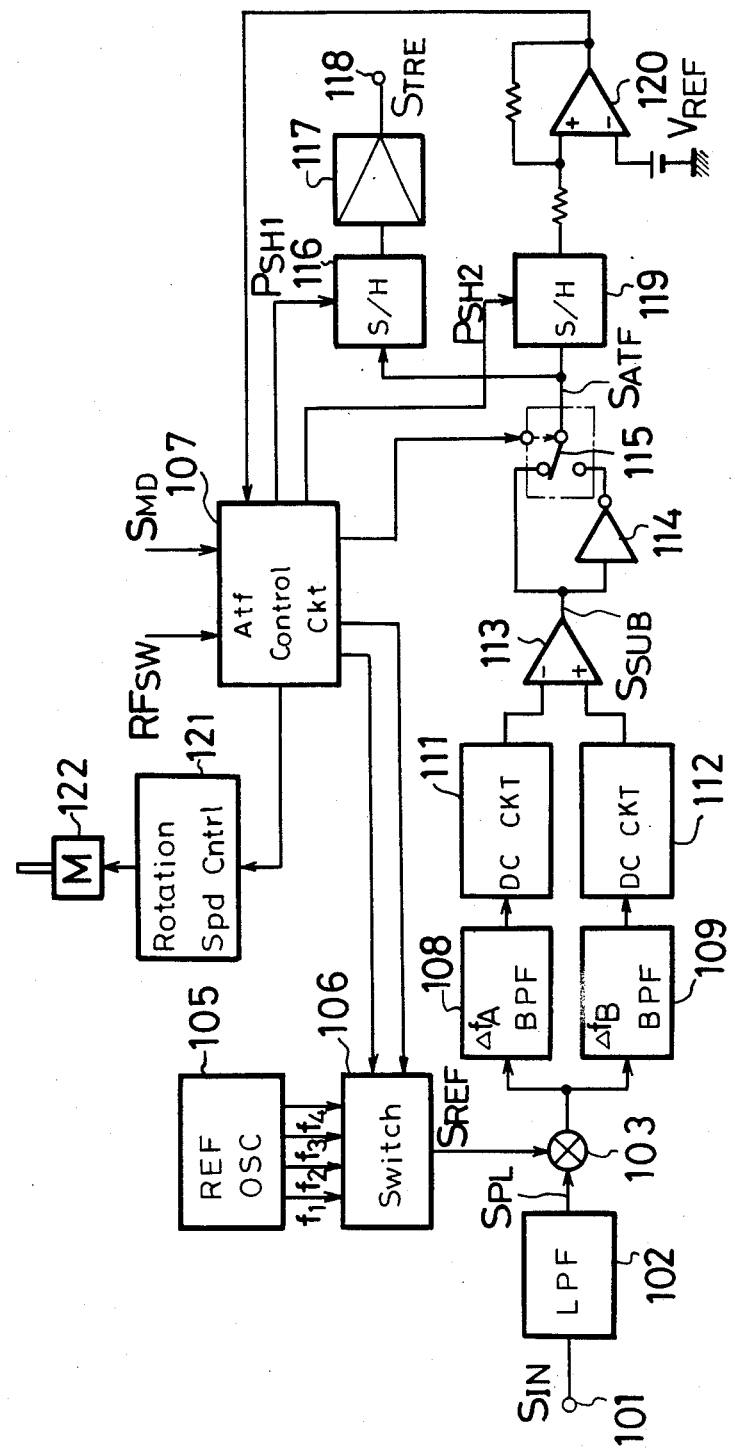
FIG. 7 is a schematic block diagram showing a preferred embodiment of tracking control apparatus according to the present invention.

FIG. 7 is a block diagram showing a case where an embodiment if the invention is applied to the reproducing system of an 8-mm VTR incorporating a four-frequency ATF system.

In the embodiment shown in FIG. 7, a signal input terminal 101 is supplied with one portion of a reproduced RF signal reproduced from a magnetic tape 104 (shown in FIGS. 8A and 8B) by a rotary video head as an input signal $S_{IN}$. A reproduced pilot signal $S_{PL}$ extracted from the input signal $S_{IN}$ by a low pass filter 102 is supplied to a multiplier 103.

Figures 8A, 8B:
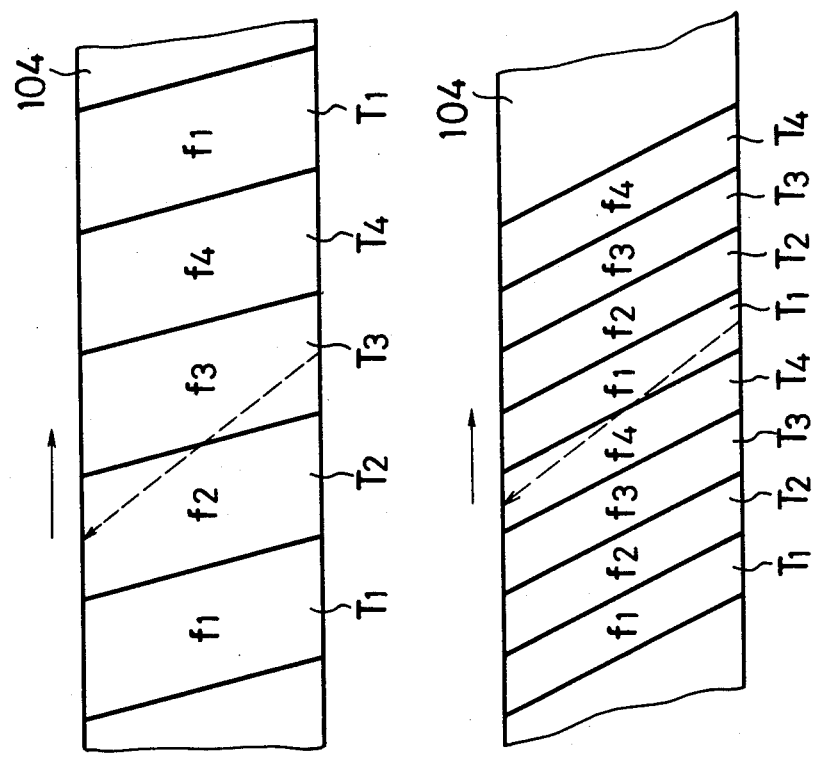
FIGS. 8A and 8B are schematic representations of track patterns of an SP (standard play) mode and an LP (long play) mode, respectively.

On the magnetic tape 104, there are sequentially and cyclically recorded four tracks T1, T2, T3 and T4 in which pilot signals of four different frequencies f1, f2, f3 and f4 are recorded obliquely together with a video signal in contacting (contiguous) relation as shown in FIGS. 8A and 8B. FIG. 8A shows a track pattern of a normal recording mode, that is, SP (standard play) mode, while FIG. 8B shows a track pattern of a long recording mode, that is, LP (long play) mode in which the recording is carried out at a tape running speed ½ the tape running speed of the SP mode.

Through a switching circuit 106 that is selectively controlled by an ATF control circuit 107, the above mentioned multiplier 103 is supplied with four kinds of reference pilot signals $S_{REF}$ respectively having four pilot frequencies f1, f2, f3 and f4 (for example, f1=102 kHz, f2=116 kHz, f3=160 kHz and f4=146 kHz). The signals of frequency f1, f2, f3, f4 are derived from a reference oscillator 105 at each field period sequentially and cyclically. The multiplier 103 multiplies the reproduced pilot signal $S_{PL}$ and the reference pilot signal $S_{REF}$. The multiplied output signal from the multiplier 103 is supplied through a first band pass filter ($\Delta f_A$ BPF) 108 to a first DC circuit 111 and also supplied through a second band pass filter ($\Delta f_B$ BPF) 109 to a second DC circuit 112.

The first band pass filter 108 extracts from the above multiplied output a difference frequency component $\Delta f_A$ that is expressed as $$\Delta f_A = |f1-f2| = |f3-f4| = 14 \text{ kHz}$$

The first DC circuit 108 converts the signal level of the difference frequency component $\Delta f_A$ extracted by the first band pass filter 108 to a DC level and supplies the same to a signal subtracter 113. The second band pass filter 109 extracts from the above multiplied output signal a difference frequency component $\Delta f_B$ that is expressed as $$\Delta f_B = |f1-f3| = |f4-f1| = 44 \text{ kHz}$$

The second DC circuit 112 converts the signal level of the difference frequency component $\Delta f_B$ extracted by the second band pass filter 109 to a DC level and supplies the same to the signal subtracter 113.

By multiplying the reproduced pilot signal $S_{PL}$ and the reference pilot signal $S_{REF}$ which are coincident in frequency in the multiplying circuit 103, the above-mentioned difference frequency components $\Delta f_A$ and $\Delta f_B$ contained in the multiplied output signal are generated from the crosstalk component produced by tracing the adjacent tracks. In the optimum tracking state in which the reproducing video head properly follows the track on the magnetic tape 104, the respective signal levels of the difference frequency components $\Delta f_A$ and $\Delta f_B$ are equal to each other. On the other hand, when a tracking error occurs, the respective signal level of the frequency components $\Delta f_A$ and $\Delta f_B$ vary reciprocally in response to the polarity and the amount of the tracking error.

The signal subtractor 113 subtracts the output signals from the first and second DC circuits 111 and 112 and supplies the subtracted output signal $S_{SUB}$ directly and also through an inverter 114 to a switching circuit 115. The switching circuit 115 is supplied with a switching control signal $S_{INV}$ derived from the ATF control circuit 107.

The switching circuit 115 selects the subtracted output signal $S_{SUB}$ directly supplied from the signal subtracter 113 and the subtracted output signal the polarity of which is inverted by the inverter 114 in response to the switching control signal $S_{INV}$ and generates an ATF error signal $S_{ATF}$. The ATF error signal $S_{ATF}$ is supplied to a first sample and hold (S/H) circuit 116 and a second sample and hold (S/H) circuit 119.

The first sample and hold circuit 116 samples and holds the ATF tracking error signal $S_{ATF}$ at a predetermined time by a sample and hold pulse $P_{SH1}$ applied thereto from the ATF control circuit 107. The first sample and hold circuit 16 supplies its sampled and held signal through an output amplifier 117 and a signal output terminal 118 to a tracking servo system (not shown) as the tracking error signal $S_{TRE}$.

The second sample and hold circuit 119 samples and holds the ATF error signal $S_{ATF}$ at a predetermined time by the sample and hold pulse $P_{SH2}$ applied thereto from the ATF control circuit 107 and supplies the sampled and held signal to a level comparator 120. The level comparator 120 converts the signal level of the sample and hold output from the second sample and hold circuit 119 to a binary code by using the reference signal level $V_{REF}$ as a threshold value. The logic signal whose level is converted to the binary code by this level comparator 120 is supplied to the ATF control circuit 107.

In the embodiment described above, the ATF control circuit 107 is supplied with a mode designating signal $S_{MD}$ which designates the operation mode of the VTR and an RF switching pulse $RF_{SW}$ which selects the respective reproduced RF signal by a reproducing video head (not shown). Accordingly, the ATF control circuit 107 generates respective control signals on the basis of the RF switching pulse $RF_{SW}$ in response to the operation mode designated by the mode designating signal $S_{MD}$ to thereby control the respective switching circuits 106, 115 and the sample and hold circuits 116 and 119 as follows.

Figure 9:
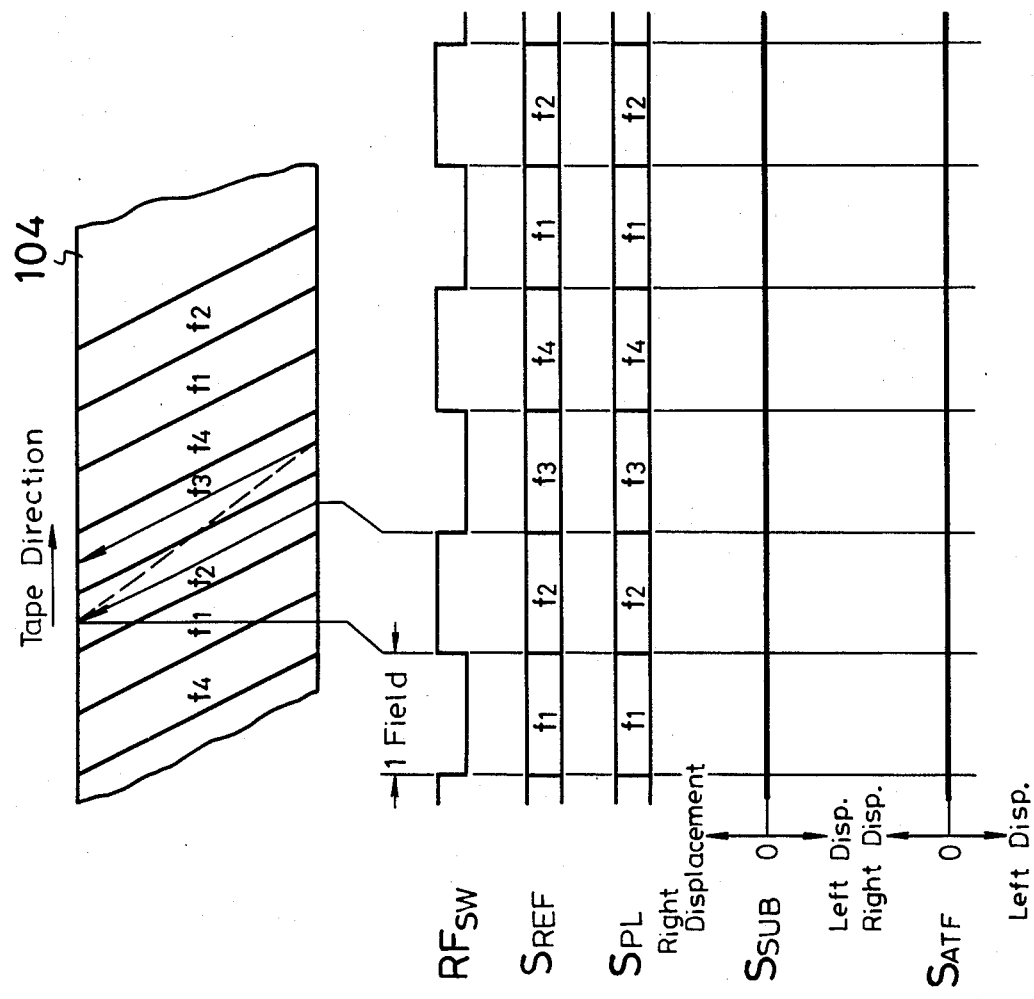
FIG. 9 is a diagram used to explain correct reproduction by the apparatus of the invention shown in FIG. 7.

When the normal reproduction operation mode is designated, the ATF control circuit 107 controls the switching circuit 106 so that on the basis of the RF switching pulse $RF_{SW}$ which alternately selects the respective RF signals reproduced by the reproducing video head at every field, the reference pilot signals $S_{REF}$ having four frequencies f1, f2, f3 and f4 produced from the reference oscillator 105 are sequentially and cyclically selected by the switching circuit 106 at every field period and the reproduced pilot signal $S_{PL}$ and the reference pilot signal $S_{REF}$ which are coincident in frequency are multiplied by the multiplier 103. In this normal reproduction operation mode, the switching circuit 115 is switched at every field by the switching control signal $S_{INV}$ that is synchronized with the RF switching pulse $RF_{SW}$, whereby to alternately select the subtracted output signal $S_{SUB}$ from the signal subtracter 113 and the subtracted output signal the polarity of which is inverted by the inverter 114 at successive fields, thus to form the ATF error signal $S_{ATF}$ the polarity of which is coincident with the direction of the tracking displacement in each field. That is, even in the reproduction mode at a variable tape running speed, it is possible to obtain the ATF error signal $S_{ATF}$ corresponding to the tracking displacement by which the servo is effected to fix the position of the noise bar on the picture screen. Then, the first sample and hold circuit 116 supplies the sample and hold output through the output amplifier 117 and the signal output terminal 118 to the tracking servo system (not shown) as the tracking error signal $S_{TRE}$. The output of the circuit 116 results from sampling and holding the ATF error signal $S_{ATF}$ at a predetermined time by using the sample and hold pulse $P_{SH1}$ from the ATF control circuit 107. When the recording mode and the reproduction mode are coincident, the ATF tracking control is carried out correctly by the tracking error signal $S_{TRE}$ as shown in FIG. 9. In this case, $S_{SUB}$ and $S_{ATF}$ are always zero.

Figure 10:
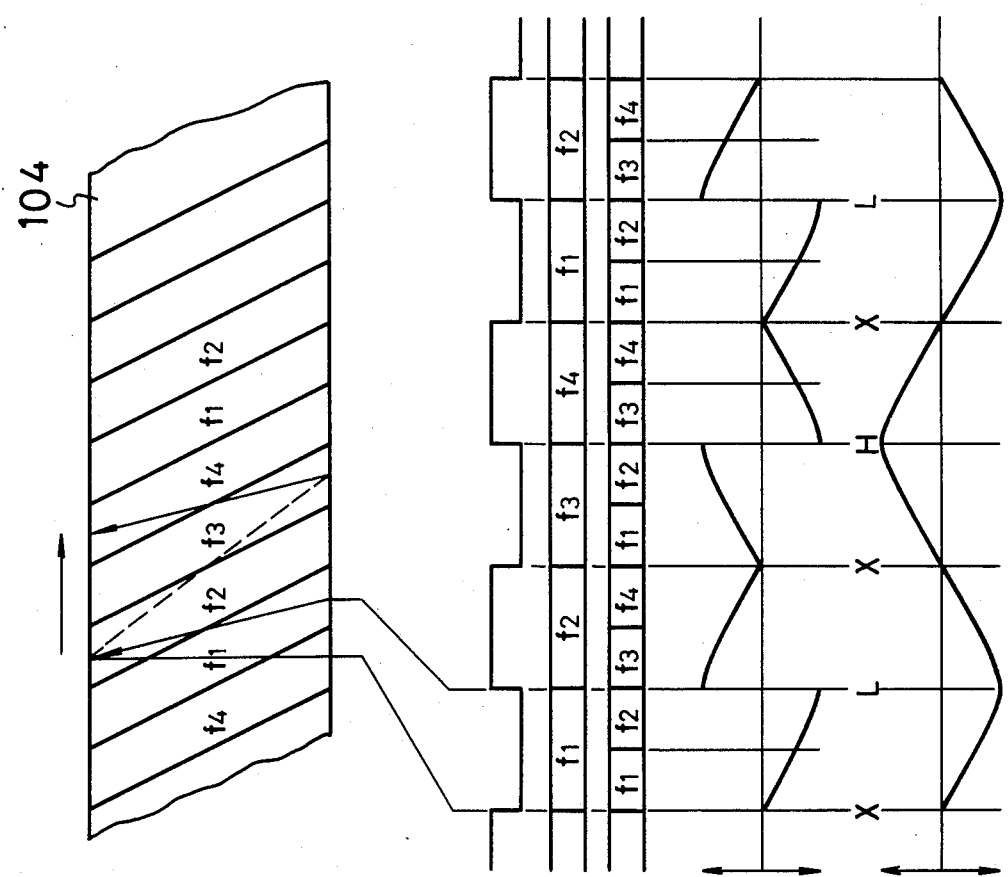
FIG. 10 is a diagram used to explain the operation in which a magnetic tape recorded in the LP mode is reproduced in the SP mode.

FIG. 10 shows a case where the recording mode and the reproduction mode running conditions are different. If for example the magnetic tape 104 recorded in the LP mode is initially reproduced in the SP mode, there occurs a fluctuation component of 15 Hz, that is, $\frac{1}{4}$ the field frequency (60 Hz). Accordingly, when the ATF error signal $S_{ATF}$ is sampled and held at every field by the second sample and hold circuit 119 and the signal level thereof is compared with the reference level $V_{REF}$ and then converted to binary code, the level "L", "H" or "X" ("X" means "don't care", that is, a negligible data) is obtained at every field. The repetitive pattern "XLXHXLXH" is obtained over several fields. The ATF control circuit 107 detects this repetitive pattern so as to control a rotation speed control circuit 121 (FIG. 7) for a capstan motor 122, and switches to the LP reproduction mode to carry out the ATF tracking control. When on the other hand the magnetic tape 104 recorded in the SP mode is initially reproduced in the LP mode, a fluctuation component of 7.5 Hz, that is $\frac{1}{8}$ the field frequency (60 Hz), occurs in the tracking error signal so that the repetitive pattern "XHHXXLLXXHHXXLLX" is obtained. The ATF control circuit 107 detects this repetitive pattern so as to control the rotation speed control circuit 121 for the capstan motor 122 and switches to the SP reproduction mode to carry out the ATF tracking control.

When reproduction at a variable tape speed is designated, in order that the tracking error signal is sampled and held once per field by the second sample and hold circuit 119 where the position at which the fluctuation component of the ATF error signal $S_{ATF}$ becomes maximum or minimum, the operation of the switching circuit 115 is controlled by the signal $S_{INV}$. It will be recalled that the ATF error signal $S_{ATF}$ is generated when the magnetic tape 104 is transported at a speed different from the tape speed during recording and that the switching circuit 115 alternately selects the subtracted output signal $S_{SUB}$ of the signal subtractor 113 and the subtracted input signal that is inverted in polarity by the inverter 114.

Even when reproduction at variable tape running speed is designated, the operation of the switching circuit 106 is controlled so that the reference pilot signals $S_{REF}$ having the four frequencies f1, f2, f3 and f4 produced by the reference oscillator 105 are selected sequentially and cyclically at every field. This is done on the basis of the RF switching pulse $RF_{SW}$ which selects alternately the respective RF signals reproduced by the reproduced video head at every field.

In forward direction reproduction at a tape speed, for example, nine times the normal tape speed, as shown by bold solid lines in FIG. 11A, when the recording mode and the reproduction mode are the same, the reproduce video head transversely scans eight tracks at every field so that, as shown in FIG. 11D, a fluctuation component of two wavelengths per field is produced in the subtracted output signal $S_{SUB}$ from the signal subtracter 113 (FIG. 7). (FIG. 11 is formed of FIGS. 11-I and 11-II drawn to two sheets of drawings to permit the use of a suitably large scale.) The switching circuit 115 is controlled by a switching control signal $S_{INV}$ (shown in FIG. 11E) in which a switching pulse of two periods per field, obtained by dividing one field by 4, is inverted in polarity at every field on the basis of the RF switching pulse $RF_{SW}$. The ATF error signal $S_{ATF}$ shown in FIG. 11H is thus generated. The sampled and held output that results from sampling and holding this ATF error signal $S_{ATF}$ by the first sample and hold circuit 116 four times at every field is supplied through the output amplifier 117 and the signal output terminal 118 to the tracking servo system (not shown) as the tracking error signal $S_{TRE}$. ATF tracking control is thus carried out. Under this condition, when the sample and hold pulse $P_{SH2}$ shown in FIG. 11G is supplied to the second sample and hold circuit 119 and thereby the ATF error signal $S_{ATF}$ is sampled and held once at every field, the level comparator 120 always generates a signal of logic "L" (low level). This signal is a so-called quasi-lock identifying signal that indicates whether or not the tracking is locked. In the quasi-locked state (i.e., when there is locking onto an unstable point), this identifying signal always becomes "H" (high level) as will be described later.

As shown by a thin solid line in FIG. 11A, when the recording pattern of the LP mode is reproduced in the SP mode, the reproducing video head scans transversely 17 tracks at every field, a fluctuation component having a wavelength of $4\frac{1}{4}$ or 17/4 per field is produced in the subtracted output signal $S_{SUB}$ from the signal subtracter 113.

As shown by a one-dot chain line in FIG. 11A, when the recorded pattern of the SP mode is reproduced in the LP mode, the reproduce video head transversely scans 3 or 5 tracks at every field, a fluctuation component having a wavelength of $\frac{7}{8}$ per field is produced in the subtracted output signal $S_{SUB}$ by the signal subtracter 113.

Accordingly, when the recording mode and the reproducing mode are not coincident, the ATF error signal $S_{ATF}$ shown in FIG. 11J or FIG. 11L is obtained through the switching circuit 115 that is controlled by the switching control signal $S_{INV}$ shown in FIG. 11E. When this ATF error signal $S_{ATF}$ is sampled and held once at every field by the sample and hold pulse $P_{SH2}$ shown in FIG. 11G, similarly to the normal reproduction mode, if the magnetic tape 104 recorded in the LP mode is initially reproduced in the SP mode, the repetitive pattern "XLXHXLXH" as shown in FIG. 11J is obtained as the output of the level comparator 120. On the other hand, if the magnetic tape 104 recorded in the SP mode is reproduced in the LP mode, the repetitive pattern "XHHXXLLXXHHXXLLX" shown in FIG. 11L is obtained as the output of the level comparator 120. The ATF control circuit 107 detects this repetitive pattern so as to switch the reproduce mode to carry out correct ATF tracking control.

The control operation in the reverse direction reproduction mode at a variable tape speed is the same in principle as in the forward direction reproduction mode at a variable tape speed except that the track number on the magnetic tape, which is scanned by the reproduce video head, is increased by one as compared with the forward direction reproduction mode at variable tape speed. The timing charts in which the reverse direction reproduction mode at a tape speed seven times the normal tape speed are shown in FIG. 12 (FIG. 12 is formed of FIGS. 12-I and 12-II in order to enable the use of a sufficiently large scale.) In FIG. 12, like parts corresponding to those of FIG. 11 are marked with the same references and are not again described in detail. Also in this reverse direction reproduction mode at variable tape speed, when the magnetic tape 104 recorded in the LP mode is initially reproduced in the SP mode, the repetitive pattern "XLXHXLXH" is obtained, while when the magnetic tape 104 recorded in the SP mode is initially reproduced in the LP mode, the repetitive pattern "XHHXXLLXXHHXXLLX" is obtained. This repetitive pattern is detected by the ATF control circuit 107 and the reproduced mode is switched, whereby correct ATF tracking control is carried out.

Figure 13:
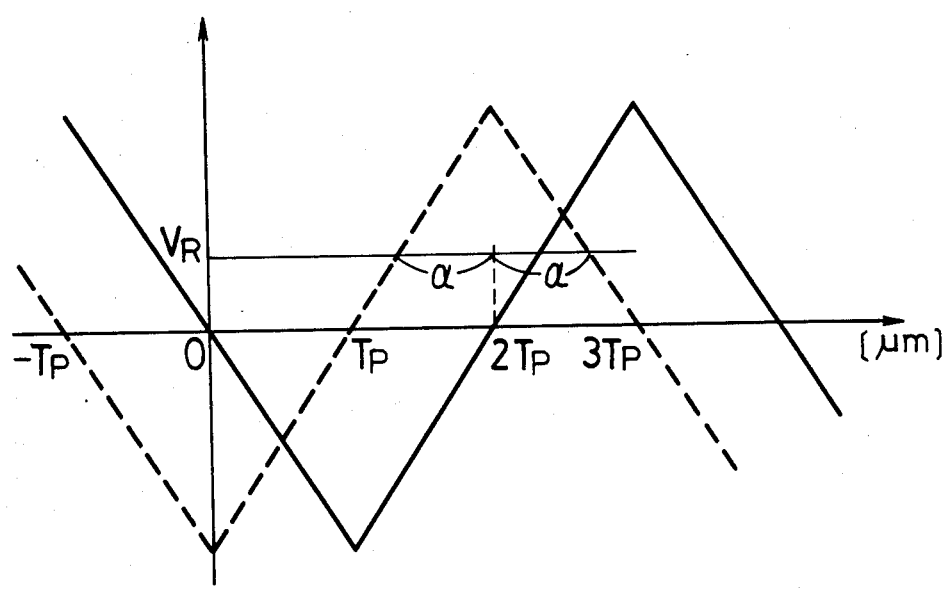
FIG. 13 is a graph showing the relationship between tracking displacement and tracking output.

The quasi-lock judging signal has a minimum value in response to the tracking error signal generated when the locus of the head is as shown by the circled A or C (FIG. 6H) and has a maximum value in response to the tracking error signal generated when the locus of the head is as shown by the circled B or D. The quasi-lock judging signal is supplied to the second comparator 120 (FIG. 7) and in this comparator 120, the reference volta $V_{REF}$ of the reference voltage source and the quasi-lock judging signal are compared with each other. In this comparison, as shown, for example, in FIG. 13, if the reference volta $V_{REF}$ is set at a value slightly higher than the 0 volt point of the ATF error signal voltage, when the scanning location of the head is near the oscillation point (i.e., has a phase of $\pm\alpha$ with respect to the oscillation point), the output from the second comparator 120 becomes high in level. On the other hand, if the scanning location of the head is not near the oscillation point, this output becomes low in level. When the quasi-locked state is detected by the high level output signal of the second comparator 120, the sequential order of the reference pilot signal is skipped by two fields by switching the switching circuit 115 or by controlling the switch 106 so that the tracking can be locked immediately.

Figure 14:
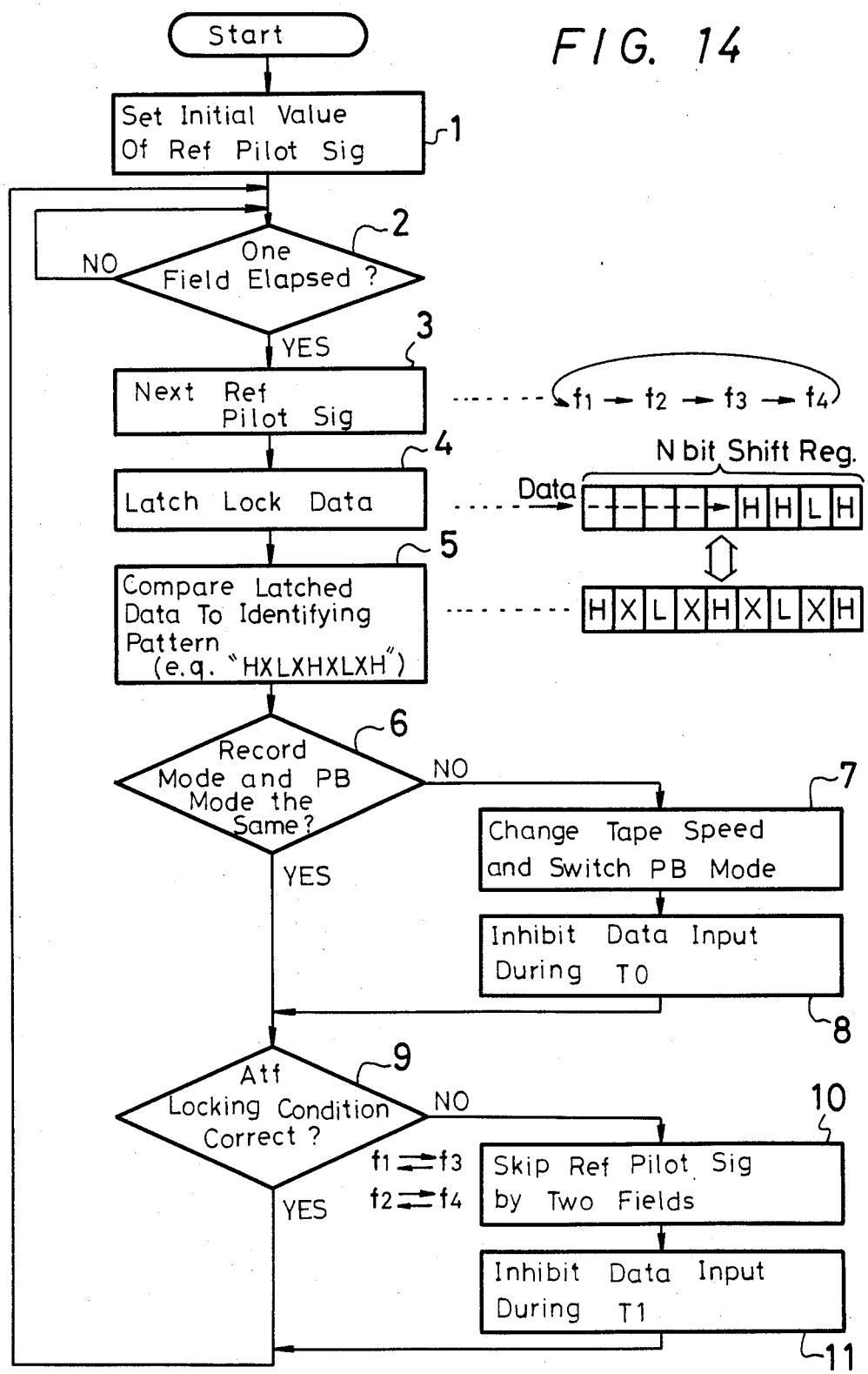
FIG. 14 is a flow chart to which reference will be made in explaining the operation of the preferred embodiment of the invention.

FIG. 14 is a flow chart to which reference will be made in explaining the total operation of the preferred embodiment of the present invention.

At step 1, an initial value of the reference pilot signal is set. At step 2, it is judged whether or not one field has elapsed. If one field has elapsed, the value of the reference pilot signal is changed to the next one (at step 3). If on the other hand one field has not yet elapsed, the standby mode is held until one field has elapsed. The lock data, that is, the output from the comparator 120, is sequentially latched in an N-bit shift register (at step 4). The content of this shift register and the basic pattern for identifying the mode such as "HXLXHXLX" are compared (at step 5). As a result, when the recording mode and the reproducing mode are not coincident at step 6, the tape speed is changed and then the mode is switched at step 7. At that time during the period of T0 (sec), data input is inhibited in order to prevent incorrect operation (at step 8). After the modes are made coincident by the data processing relating to the alteration of the reproducing mode as described above, the locking condition of the ATF is judged at step 9. When the ATF is in the oscillation state, that is, it is in the unstable point, at step 10, the sequential order of the reference pilot signal is skipped by two fields so as to put the ATF into the locked condition. At step 11, as in step 8, the data input is inhibited during a period of T1 (sec) in order to prevent incorrect operation.

As set forth above, the recording mode and the reproducing mode are made coincident and the ATF is put into the locked state. The data of the next field is then supplied as an input.

The preceding description is of a single preferred embodiment of the invention, but it is apparent that many modifications and variations can be effected by one skilled in the art with out departing from the spirit or scope of the invention. The scope of the invention should therefore be determined by the appended claims only.

I claim as my invention:

1. Recording/reproducing apparatus wherein pilot signals of four different frequencies are recorded cyclically and in a predetermined sequence on parallel record tracks on a moving record medium together with a video signal organized in a series of fields and are employed to control tracking of a reproducing head of said apparatus during reproduction; said apparatus comprising:

means operable in a reproduction mode of said apparatus for moving said record medium at a reproducing speed higher than a normal speed;

means for generating four reference pilot signals;

multiplying means for multiplying reproduced pilot signals with said reference pilot signal in successive cycles of a predetermined sequence, thereby generating a tracking error signal;

sample and hold means for sampling and holding said tracking error signal at predetermined points of a plurality of said fields;

means for generating a reference signal;

comparator means for effecting a comparison of the output of said sample and hold means with said reference signal and producing a comparator output signal having a state that depends on said comparison, wherein said tracking is intended to achieve a locked state with respect to said pilot signals when in proper phase relation thereto but sometimes achieves a quasi-locked stated at an unstable point not in proper phase relation thereto; and means responsive to said comparator output signal for establishing said locked state; wherein, when said tracking is in said quasi-locked state, said means for establishing said locked state effects a skip in said predetermined sequence by omission of two of said pilot signals from one cycle of said predetermined sequence in order to establish said locked state.

2. Apparatus according to claim 1; wherein said record medium is an elongated magnetic tape and said record tracks are slanted across said magnetic tape, said tracks being contiguous and each of said tracks corresponding to one of said fields.

3. Apparatus according to claim 1; wherein said apparatus in a recording mode records at a given recording speed; further comprising means for determining whether or not said reproducing speed matches said recording speed and, if it does not, for adjusting said reproducing speed so that it matches said recording speed.

4. Apparatus according to claim 3; wherein a determination of whether or not said recording speed matches said reproducing speed is made by means for determining whether or not said comparator output signal corresponds to a predetermined pattern.

* * * * *